(12) United States Patent
Liao

(10) Patent No.: US 7,617,569 B2
(45) Date of Patent: Nov. 17, 2009

(54) ARTICULATION HAVING ANGLE ADJUSTABLE FUNCTION

(75) Inventor: Gordon Liao, Yung Kang (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 553 days.

(21) Appl. No.: 11/595,195

(22) Filed: Nov. 9, 2006

(65) Prior Publication Data

US 2008/0109994 A1   May 15, 2008

(51) Int. Cl.
*E05D 11/10* (2006.01)

(52) U.S. Cl. .............................. 16/334; 16/297; 16/354; 403/97

(58) Field of Classification Search .................... 16/334, 16/297, 321, 319, 374, 354; 403/97; 5/99.1; 280/47.371; 74/551.3
See application file for complete search history.

(56) References Cited

U.S. PATENT DOCUMENTS

| | | | | |
|---|---|---|---|---|
| 4,614,454 A | * | 9/1986 | Kassai | 403/62 |
| 5,039,118 A | * | 8/1991 | Huang | 280/47.371 |
| 5,062,179 A | * | 11/1991 | Huang | 16/436 |
| 5,123,768 A | * | 6/1992 | Franklin | 403/96 |
| 5,377,368 A | * | 1/1995 | Cheng | 5/99.1 |
| 5,542,151 A | * | 8/1996 | Stranski et al. | 16/326 |
| 6,948,197 B1 | * | 9/2005 | Chen | 5/93.1 |

* cited by examiner

*Primary Examiner*—William L. Miller
(74) *Attorney, Agent, or Firm*—Alan Kamrath; Kamrath & Associates PA

(57) ABSTRACT

An articulation includes a first shell, a second shell, a gear wheel, a push button, and an elastic member. Thus, the second shell is unlocked from the first shell by pressing the push button so that the second shell is rotatable freely relative to the first shell so as to adjust the angle between the second shell and the first shell. In addition, when each of the limit plates of the gear wheel is separated from a respective limit slot of the second shell, the gear wheel is stopped by the second shell and is not pushed by the elastic member, so that the second shell is rotatable freely relative to the first shell through a larger angle without having to press the push button successively, thereby facilitating a user adjusting the angle in an energy-saving manner.

15 Claims, 11 Drawing Sheets

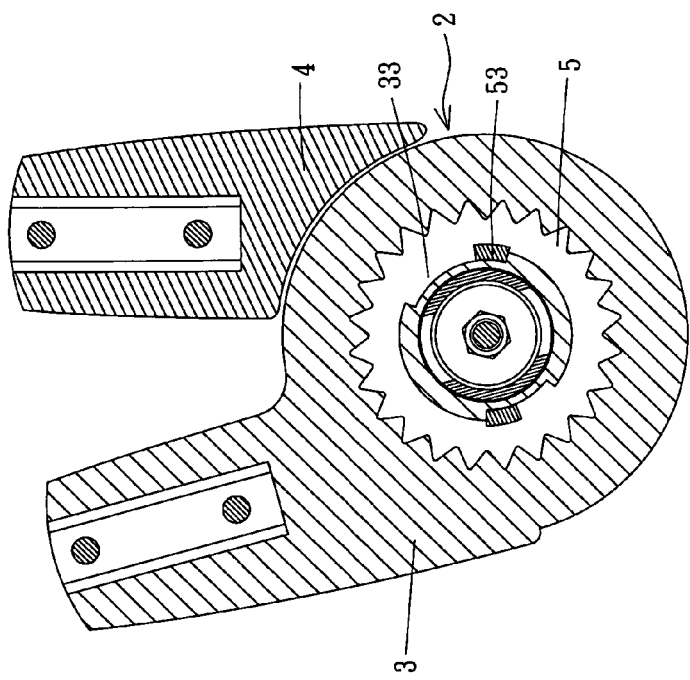
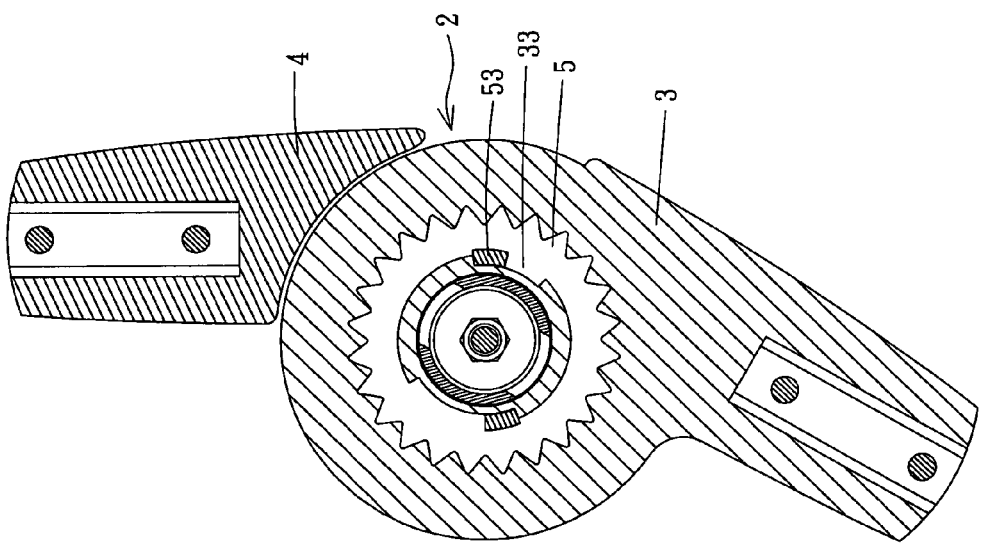
FIG. 7
FIG. 6

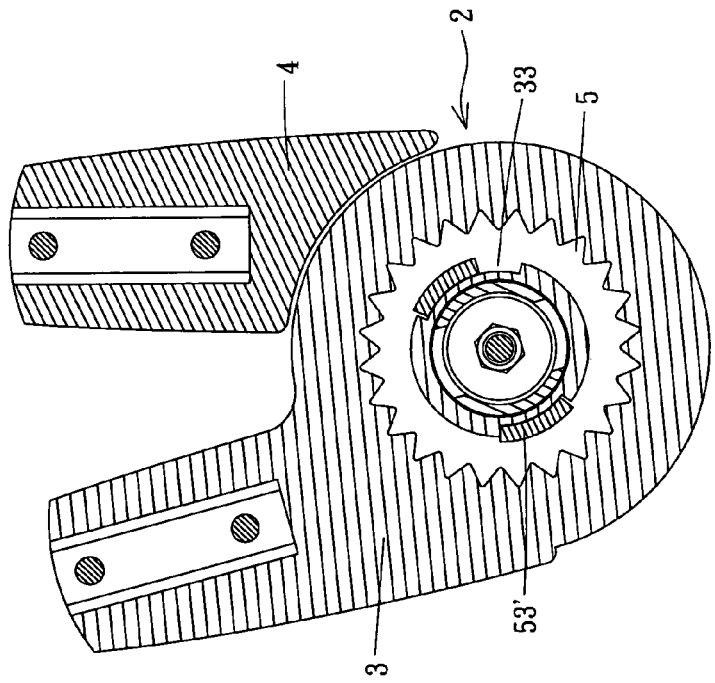
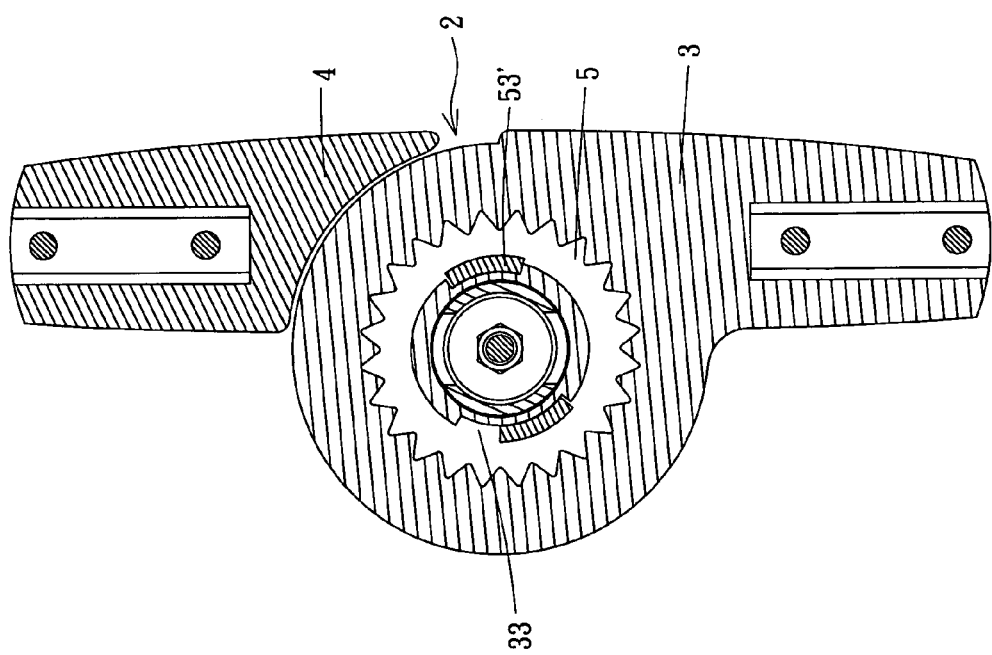

ARTICULATION HAVING ANGLE ADJUSTABLE FUNCTION

BACKGROUND OF THE INVENTION

1. Field of the Invention

The present invention relates to an articulation and, more particularly, to an articulation having angle adjustable function.

2. Description of the Related Art

A conventional articulation 1 in accordance with the prior art shown in FIG. 14 comprises an eccentric drive handle 11 to fix a toothed disk. However, the user has to drive the drive handle 11 to lock or unlock the toothed disk, thereby causing inconvenience to the user. In addition, the toothed disk cannot be locked automatically.

Another conventional articulation 1A in accordance with the prior art shown in FIG. 15 comprises a toothed disk 13, and a push button 12 to fix the angle the toothed disk 13. However, the user has to press the push button 12 successively to fix the toothed disk 13 so as to adjust the angle of the articulation, thereby causing inconvenience to the user.

Another conventional articulation 1B in accordance with the prior art shown in FIG. 16 comprises a toothed disk 15, and a push button 14 to fix the angle the toothed disk 15. The toothed disk 15 is locally provided some teeth 150, so that the angle of the articulation can be adjusted in a jumping type without having to press the push button 14 successively. However, the toothed disk 15 is locally provided some teeth 150, so that the articulation has a weaker strength and is easily worn out or broken.

BRIEF SUMMARY OF THE INVENTION

The primary objective of the present invention is to provide an articulation, includes a first shell, a second shell, a gear wheel, a push button, and an elastic member. Thus, the second shell is unlocked from the first shell by pressing the push button so that the second shell is rotatable freely relative to the first shell so as to adjust the angle between the second shell and the first shell. In addition, when each of the limit plates of the gear wheel is separated from a respective limit slot of the second shell, the gear wheel is stopped by the second shell and is not pushed by the elastic member, so that the second shell is rotatable freely relative to the first shell through a larger angle without having to press the push button successively, thereby facilitating a user adjusting the angle in an energy-saving manner.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 6 is a schematic operational view of the articulation as shown in FIG. 5.

FIG. 7 is a schematic operational view of the articulation as shown in FIG. 6.

FIG. 8 is a plan cross-sectional assembly view of an articulation in accordance with another preferred embodiment of the present invention.

FIG. 9 is a schematic operational view of the articulation as shown in FIG. 8.

DETAILED DESCRIPTION OF THE INVENTION

Figure 1:
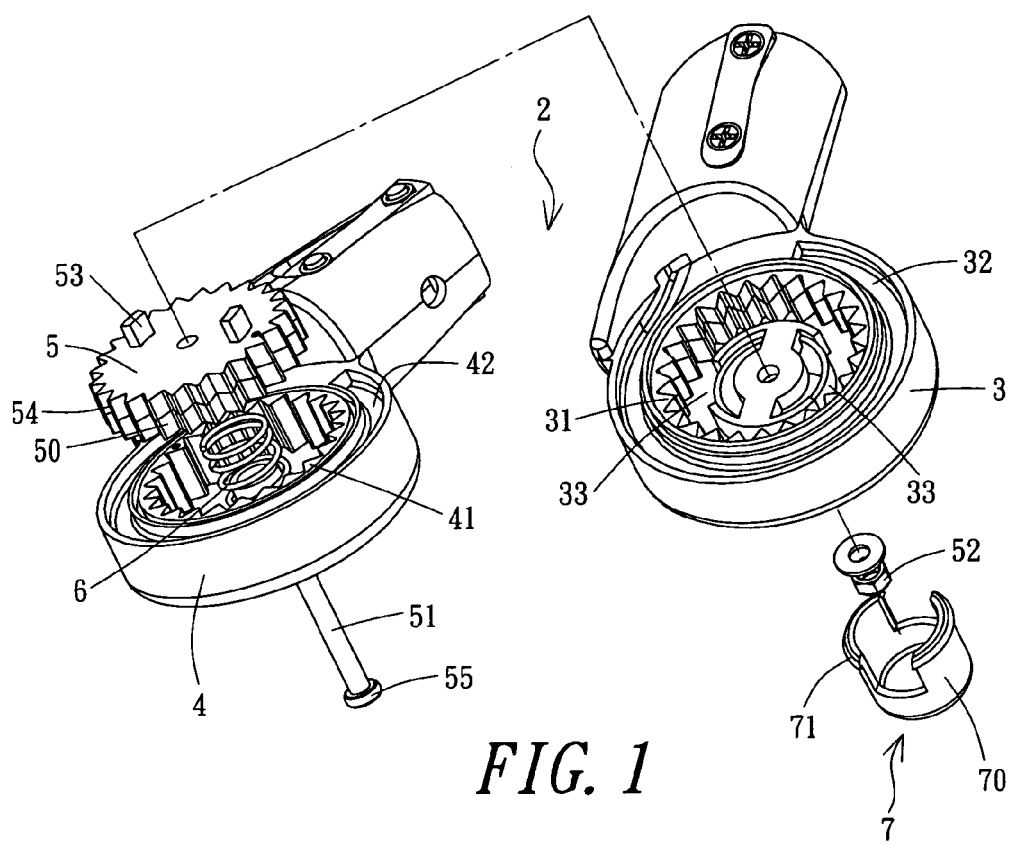
FIG. 1 is an exploded perspective view of an articulation in accordance with the preferred embodiment of the present invention.
Figure 2:
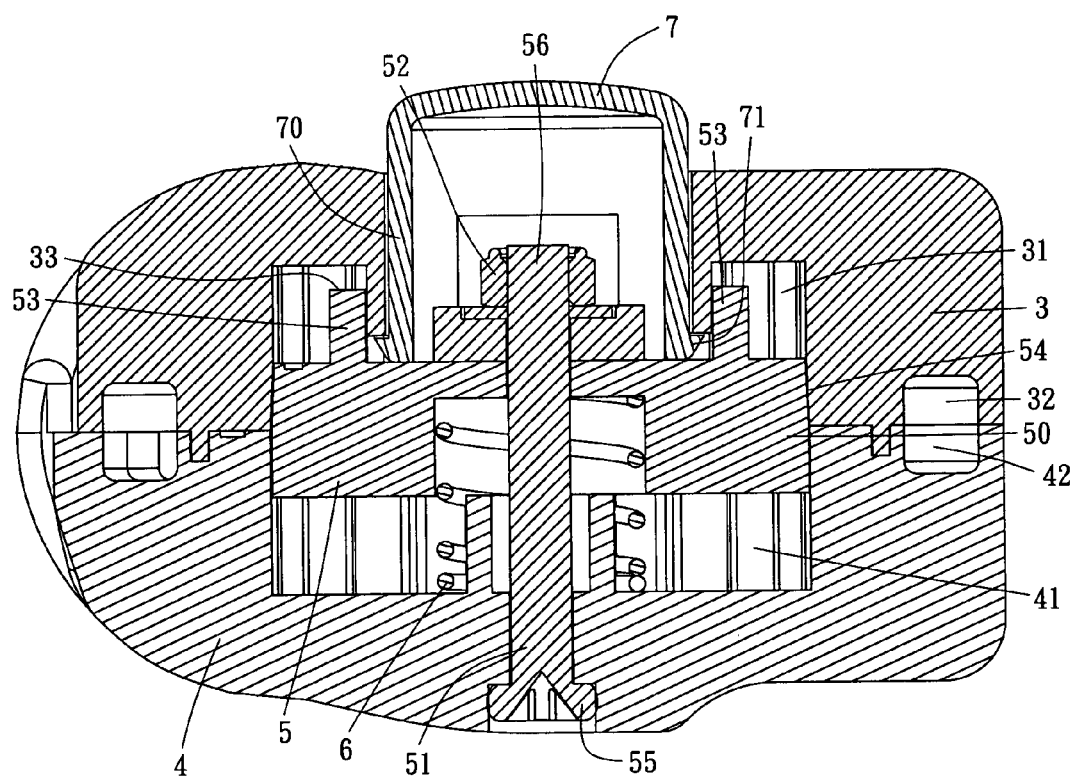
FIG. 2 is a plan cross-sectional assembly view of the articulation as shown in FIG. 1.
Figure 3:
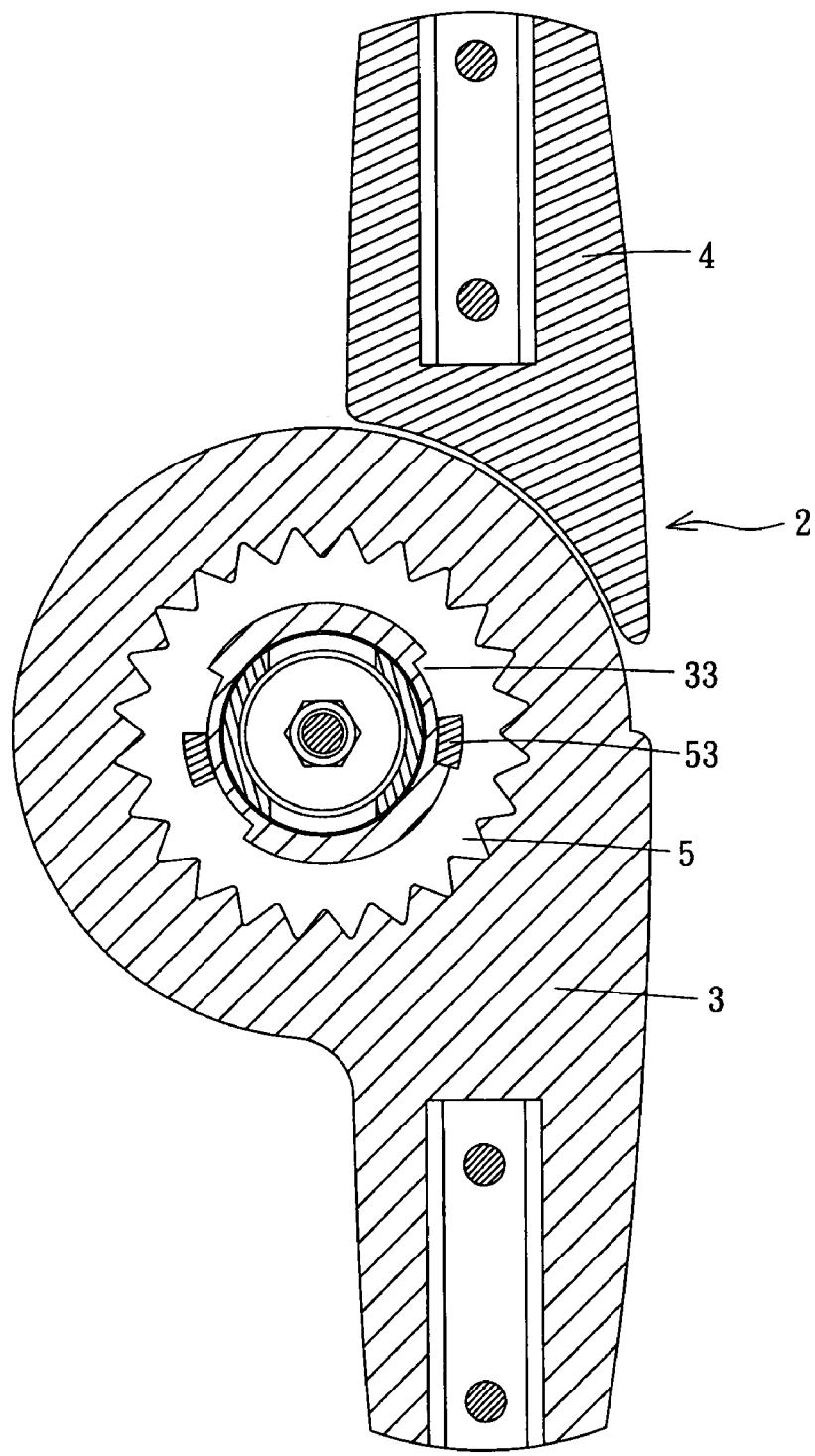
FIG. 3 is a plan cross-sectional assembly view of the articulation as shown in FIG. 1.

Referring to the drawings and initially to FIGS. 1-3, an articulation 2 in accordance with the preferred embodiment of the present invention comprises a first shell 4 having an inner wall provided with a plurality of first teeth 41, a second shell 3 rotatable relative to the first shell 4 and having an inner wall provided with a plurality of second teeth 31, a gear wheel 5 movably mounted between the first shell 4 and the second shell 3 and intermeshing with the first teeth 41 of the first shell 4 and the second teeth 31 of the second shell 3 to lock the first shell 4 and the second shell 3, a push button 7 movably mounted on the second shell 3 and rested on the gear wheel 5 to push and move the gear wheel 5 to detach from the second teeth 31 of the second shell 3 so as to unlock the second shell 3 from the first shell 4 so that the second shell 3 is rotatable relative to the first shell 4, and an elastic member 6 biased between the first shell 4 and the gear wheel 5 to push the gear wheel 5 toward the second shell 3 and the push button 7.

The first shell 4 has a peripheral wall formed with a first receiving groove 42. The first teeth 41 of the first shell 4 are arranged in an annular shape.

The second shell 3 has a peripheral wall formed with a second receiving groove 32 aligning with the first receiving groove 42 of the first shell 4 so that a cord (not shown) is received between the first receiving groove 42 of the first shell 4 and the second receiving groove 32 of the second shell 3. The second teeth 31 of the second shell 3 are arranged in an annular shape. The second shell 3 has an inner portion formed with two substantially arc-shaped radially opposite limit slots 33.

The articulation 2 further comprises a screw member 51 in turn extended through the first shell 4, the elastic member 6, the gear wheel 5 and the second shell 3, and a nut 52 screwed onto the screw member 51 and rested on the second shell 3, so that the first shell 4 is combined with the second shell 3, and the gear wheel 5 is movable on the screw member 51 relative to the first shell 4 and the second shell 3. The screw member 51 has a first end formed with an enlarged head 55 secured in the first shell 4 and a second end 56 protruded from the second shell 3 and screwed into the nut 52.

The gear wheel 5 has a first side directed toward the second shell 3 and formed with two substantially arc-shaped radially opposite limit plates 53 each extendable into a respective limit slot 33 of the second shell 3 and a second side directed toward the first shell 4 and rested on the elastic member 6. The gear wheel 5 has a toothed periphery 50 extending through a whole circumferential length of the gear wheel 5 and intermeshing with the first teeth 41 of the first shell 4 and the second teeth 31 of the second shell 3. The toothed periphery 50 of the gear wheel 5 has an upwardly inclined guide ramp 54 rested on the inner wall of the first shell 4 and the inner wall of the second shell 3 so that the gear wheel 5 is pushed by the elastic member 6 to move toward the second teeth 31 of the second shell 3 easily and smoothly by guidance of the guide ramp 54. The gear wheel 5 is located between the first shell 4 and the second shell 3 by push of the elastic member 6 so that the gear wheel 5 intermeshes with the first teeth 41 of the first shell 4 and the second teeth 31 of the second shell 3 at a normal state, and each of the limit plates 53 of the gear wheel 5 is located in the respective limit slot 33 of the second shell 3 at a normal state.

The push button 7 partially protrudes outwardly from the second shell 3 at a normal state by push of the second shell 3 and the elastic member 6 and has two downwardly extending radially opposite push plates 70 each extended through the second shell 3 and each rested on the gear wheel 5 to push the gear wheel 5. Each of the push plates 70 of the push button 7 is substantially arc-shaped and has a distal end formed with an outwardly extending locking hook 71 hooked onto a bottom wall of the second shell 3 to attach the push button 7 to the second shell 3.

As shown in FIG. 2, the gear wheel 5 intermeshes with the first teeth 41 of the first shell 4 and the second teeth 31 of the second shell 3 at a normal state, so that the first shell 4 and the second shell 3 are locked by the gear wheel 5.

Figure 4:
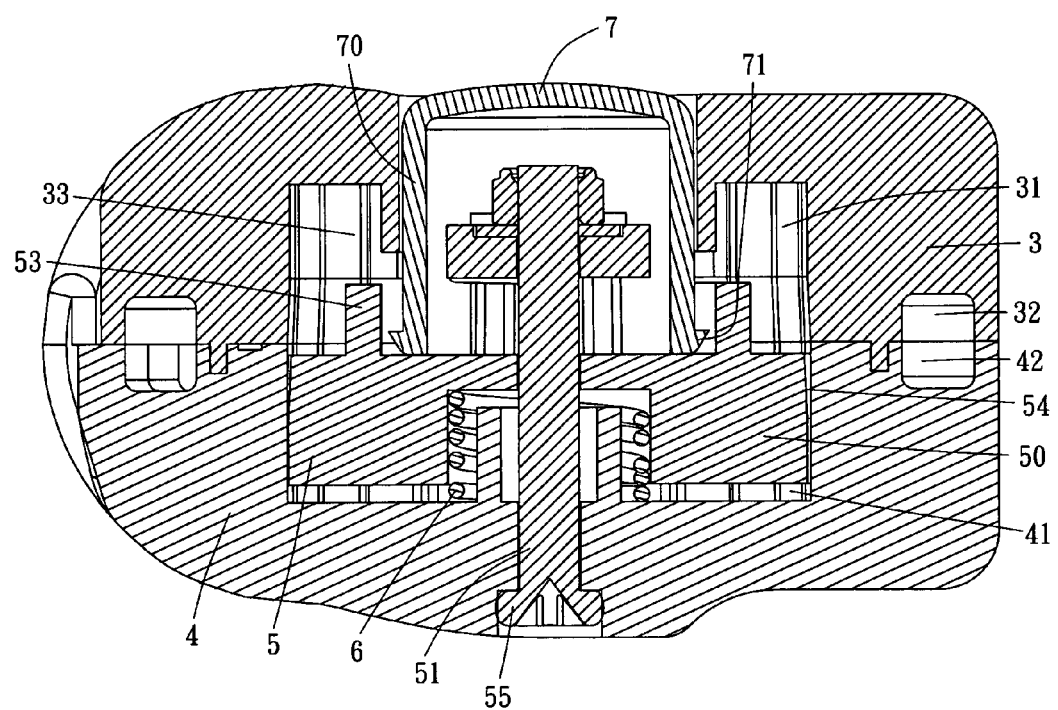
FIG. 4 is a schematic operational view of the articulation as shown in FIG. 2.
Figure 5:
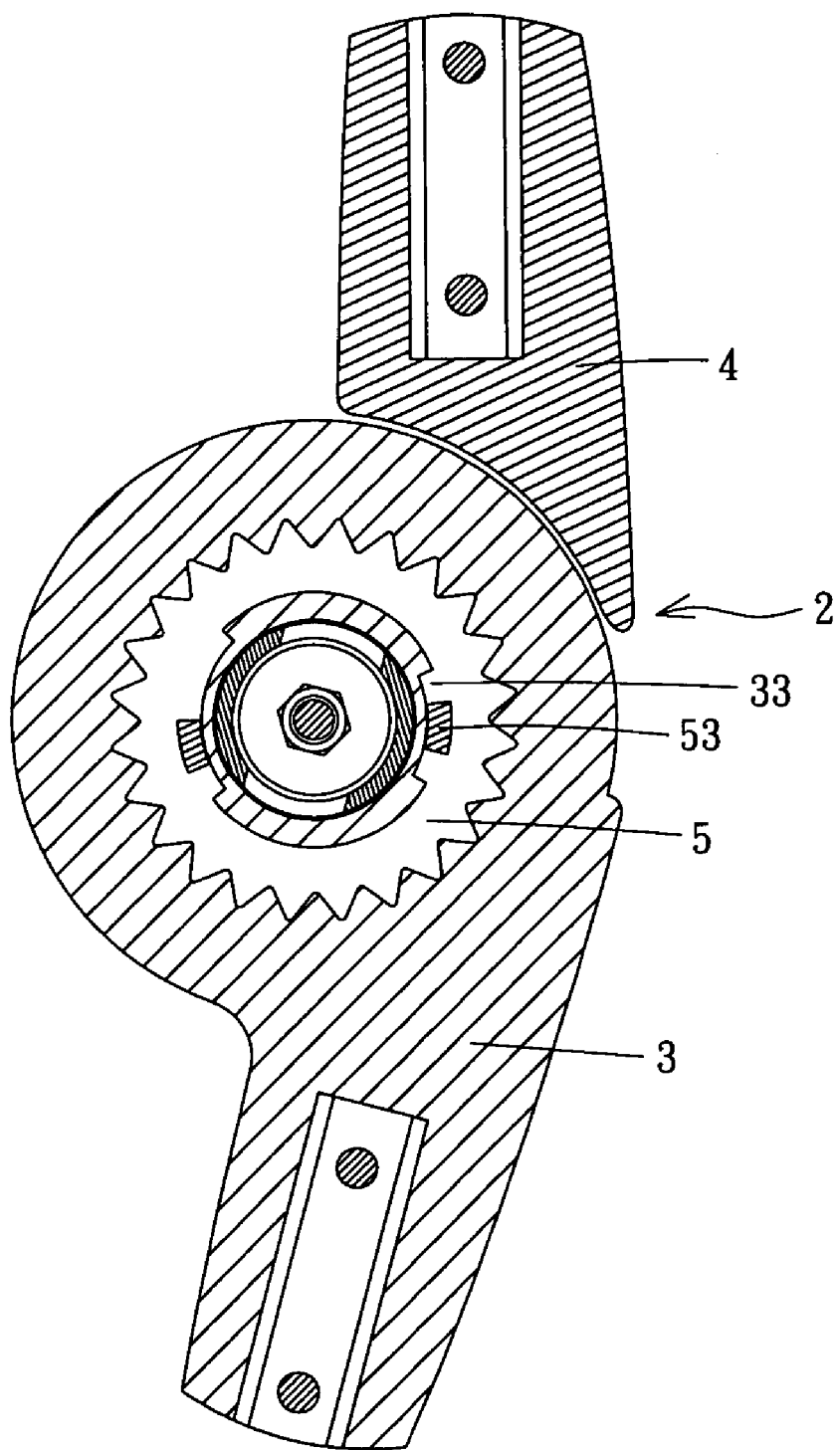
FIG. 5 is a schematic operational view of the articulation as shown in FIG. 3.

As shown in FIG. 4, when the push button 7 is pressed toward the gear wheel 5, the gear wheel 5 is pushed by the push button 7 to detach from the second teeth 31 of the second shell 3 so as to unlock the second shell 3 from the first shell 4 so that the second shell 3 is rotatable freely relative to the first shell 4 so as to adjust the angle between the second shell 3 and the first shell 4 as shown in FIGS. 5-7. At this time, when the gear wheel 5 is pushed by the push button 7 to detach from the second teeth 31 of the second shell 3, each of the limit plates 53 of the gear wheel 5 is also detached from the respective limit slot 33 of the second shell 3.

After adjustment of the angle between the second shell 3 and the first shell 4, the force applied on the push button 7 is removed to release the push button 7, so that the gear wheel 5 is pushed by the restoring force of the elastic member 6 to return to the original state and to intermesh with the first teeth 41 of the first shell 4 and the second teeth 31 of the second shell 3, such that the first shell 4 and the second shell 3 are locked by the gear wheel 5 again as shown in FIG. 2. At this time, each of the limit plates 53 of the gear wheel 5 is located in the respective limit slot 33 of the second shell 3. In addition, the gear wheel 5 is pushed by the elastic member 6 to move toward the second teeth 31 of the second shell 3 easily and smoothly by guidance of the guide ramp 54.

In practice, the first shell 4 has twenty four (24) first teeth 41 each having an angle of fifteen (15) degrees, and the second shell 3 also has twenty four (24) second teeth 31 each having an angle of fifteen (15) degrees, so that the second shell 3 is rotatable relative to the first shell 4 through fifteen (15) degrees at each adjustment. At this time, each of the limit slots 33 of the second shell 3 has an angle of thirty (30) degrees, so that each of the limit slots 33 of the second shell 3 only allows a rotation angle of thirty (30) degrees. Thus, when the second shell 3 is rotatable relative to the first shell 4 through a rotation angle of thirty (30) degrees as shown in FIG. 6, each of the limit plates 53 of the gear wheel 5 is still located in the respective limit slot 33 of the second shell 3.

On the contrary, when the second shell 3 is rotatable relative to the first shell 4 to exceed a rotation angle of thirty (30) degrees, each of the limit plates 53 of the gear wheel 5 is located outside of the respective limit slot 33 of the second shell 3, so that the gear wheel 5 will not be pushed by the elastic member 6 to move toward the second teeth 31 of the second shell 3 even when the push button 7 is released.

In such a manner, the second shell 3 is rotatable freely relative to the first shell 4 until each of the limit plates 53 of the gear wheel 5 is aligned with another respective limit slot 33 of the second shell 3. Thus, the second shell 3 is rotatable freely relative to the first shell 4 through a larger angle (from 0 degree to 165 degrees) as shown in FIGS. 6 and 7 to perform a jumping type stepless angle adjustment function without having to press the push button 7 successively, thereby greatly facilitating a user adjusting the angle between the second shell 3 and the first shell 4. In addition, the size of each of the limit plates 53 of the gear wheel 5 or each of the limit slots 33 of the second shell 3 can be changed to perform a different jumping type stepless angle adjustment function.

In conclusion, the second shell 3 is rotatable relative to the first shell 4 between a first position where each of the limit plates 53 of the gear wheel 5 is aligned with a respective limit slot 33 of the second shell 3, so that the gear wheel 5 is pushed by the elastic member 6 to move toward the second teeth 31 of the second shell 3 to lock the second shell 3 onto the first shell 4 and to push the push button 7 to partially protrude outwardly from the second shell 3, and a second position where each of the limit plates 53 of the gear wheel 5 is separated from a respective limit slot 33 of the second shell 3, so that the gear wheel 5 is stopped by the bottom wall of the second shell 3 and is not pushed by the elastic member 6, and that the second shell 3 is rotatable freely relative to the first shell 4 through a larger angle without having to press the push button 7 successively, thereby greatly facilitating a user adjusting the angle between the second shell 3 and the first shell 4.

As shown in FIGS. 8 and 9, the size of each of the limit plates 53' of the gear wheel 5 is changed to perform a different jumping type stepless angle adjustment function, so that the articulation is locked only at the 0 degree and the 165 degrees.

Figure 11:
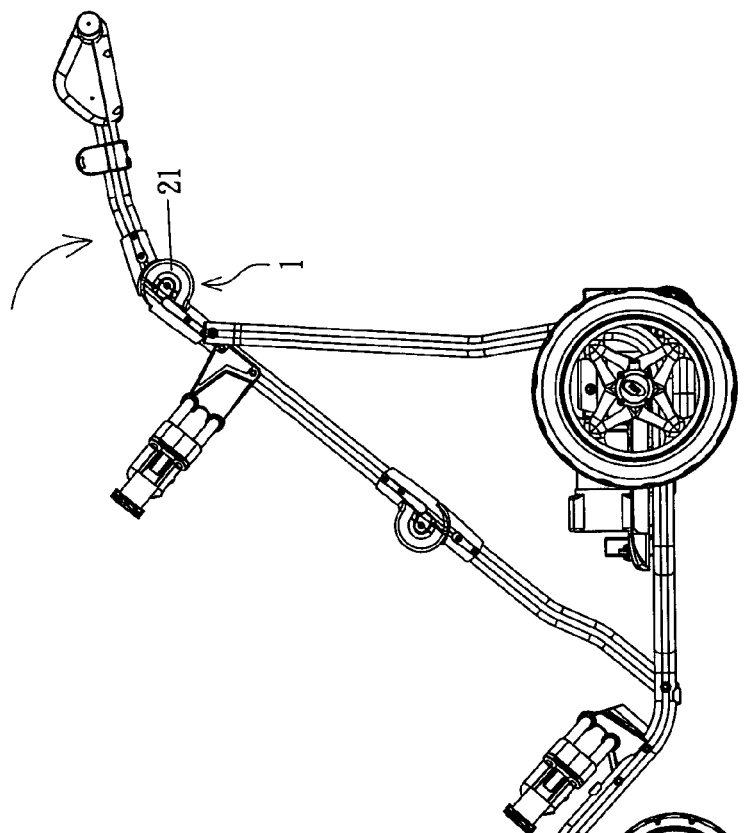
FIG. 11 is a schematic operational view of the articulation as shown in FIG. 10.
Figure 10:
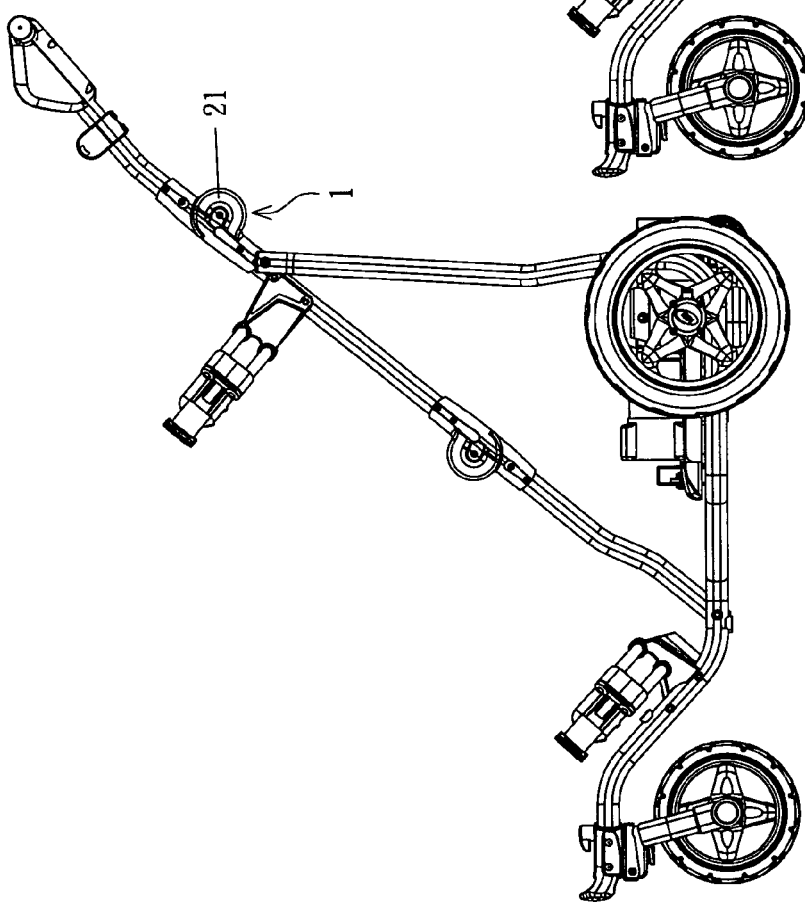
FIG. 10 is a plan view of the articulation for a golf cart.

As shown in FIGS. 10 and 11, the articulation 2 is mounted on an upper joint 21 of a golf cart to provide an angle adjustment function.

Figure 13:
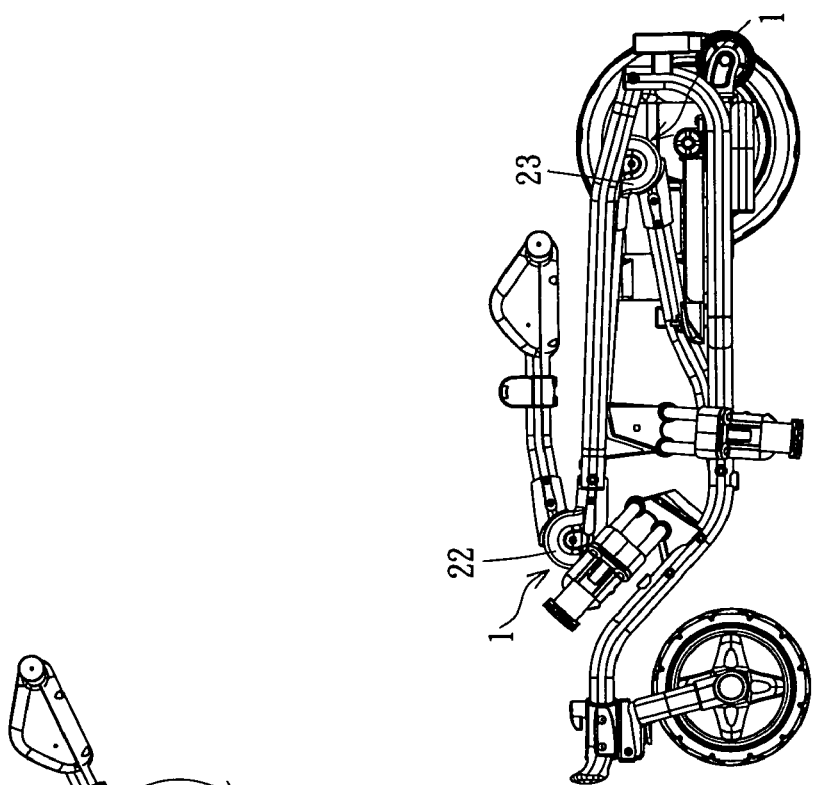
FIG. 13 is a schematic operational view of the articulation as shown in FIG. 12.
Figure 12:
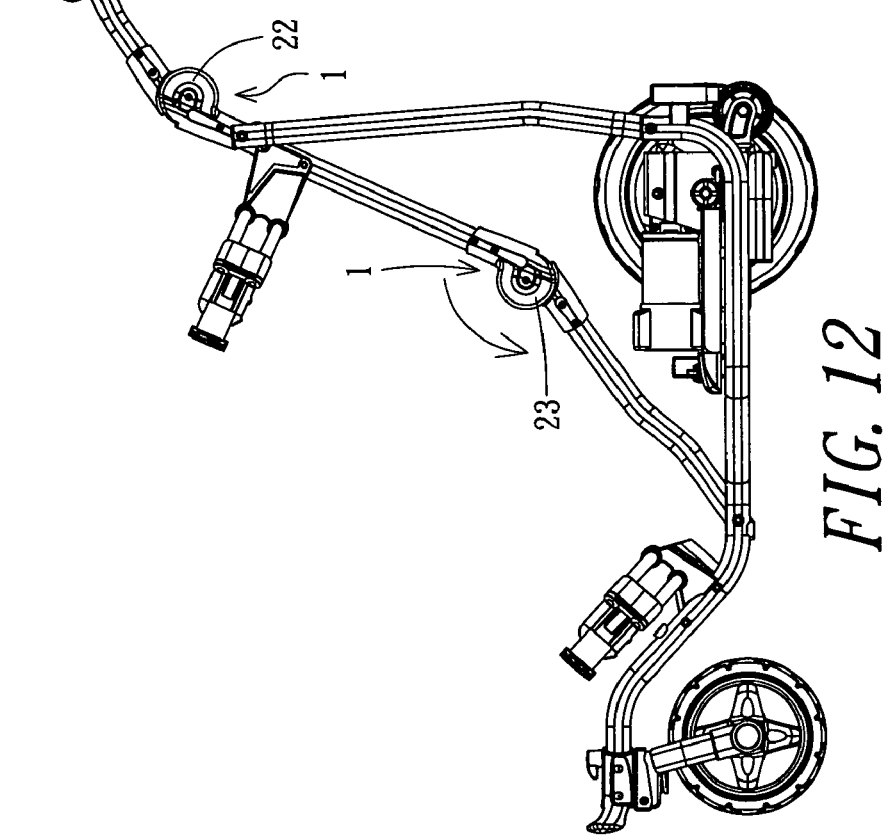
FIG. 12 is a plan view of the articulation for a golf cart.
Figure 14:
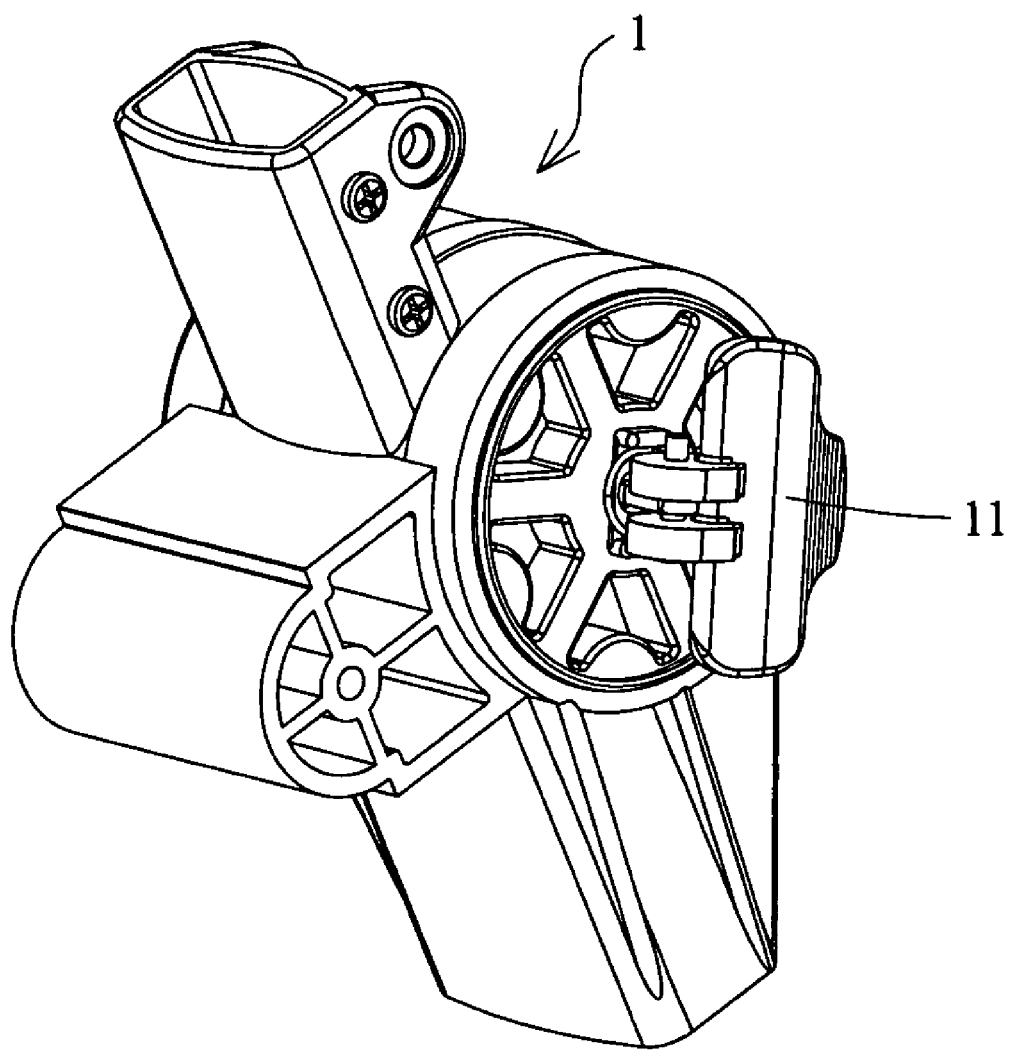
FIG. 14 is a perspective view of a conventional articulation in accordance with the prior art.
Figure 15:
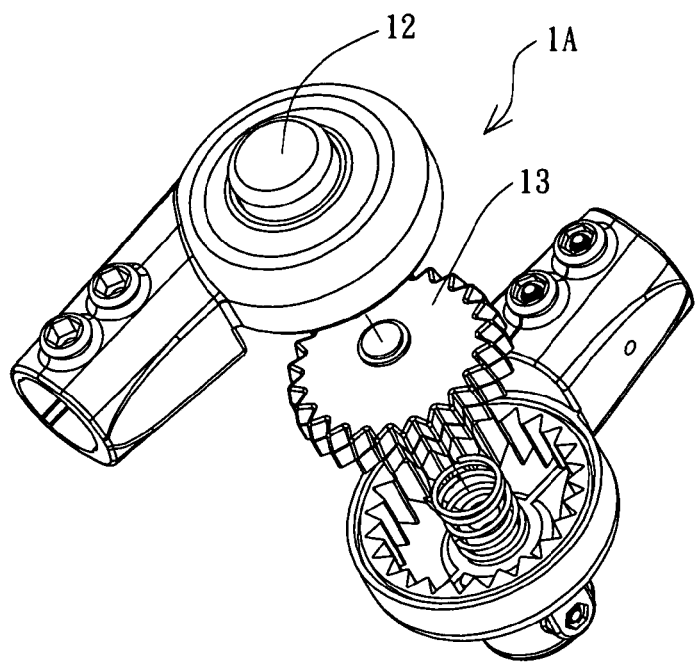
FIG. 15 is an exploded perspective view of another conventional articulation in accordance with the prior art.
Figure 16:
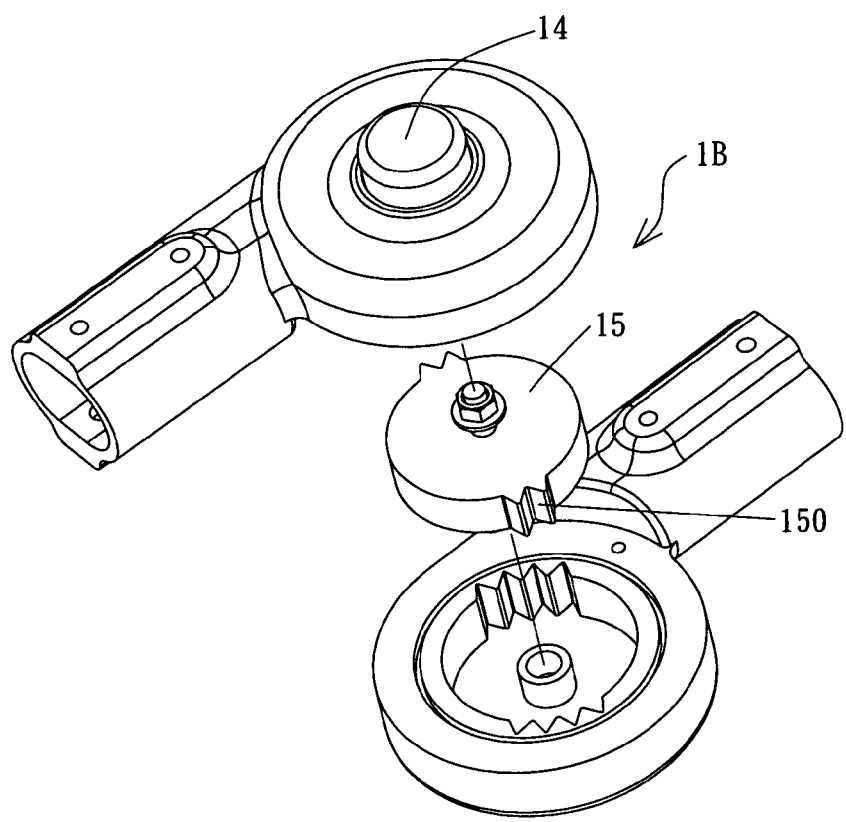
FIG. 16 is an exploded perspective view of another conventional articulation in accordance with the prior art.

As shown in FIGS. 12 and 13, the articulation 2 is mounted on an upper joint 22 and a lower joint 23 of a golf cart to provide an angle adjustment function.

Accordingly, the second shell 3 is unlocked from the first shell 4 by pressing the push button 7 so that the second shell 3 is rotatable freely relative to the first shell 4 so as to adjust the angle between the second shell 3 and the first shell 4. In addition, when each of the limit plates 53 of the gear wheel 5 is separated from a respective limit slot 33 of the second shell 3, the gear wheel 5 is stopped by the bottom wall of the second shell 3 and is not pushed by the elastic member 6, so that the second shell 3 is rotatable freely relative to the first shell 4 through a larger angle without having to press the push button 7 successively, thereby facilitating a user adjusting the angle between the second shell 3 and the first shell 4 in an energy-saving manner. Further, when each of the limit plates 53 of the gear wheel 5 is aligned with a respective limit slot 33 of the second shell 3, the gear wheel 5 is pushed by the elastic member 6 to move toward the second teeth 31 of the second shell 3 to lock the second shell 3 onto the first shell 4 and to push the push button 7 to protrude outwardly from the second shell 3, so that the articulation is locked automatically, thereby facilitating the user operating the articulation. Further, the toothed periphery 50 extends a whole circumferential length of the gear wheel 5, so that the articulation has a reinforced strength. Further, the cord is received between the first receiving groove 42 of the first shell 4 and the second receiving groove 32 of the second shell 3 to prevent the cord from being exposed outwardly from the articulation. Further, the gear wheel 5 is pushed by the elastic member 6 to move toward the second teeth 31 of the second shell 3 easily and smoothly by guidance of the guide ramp 54.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An articulation, comprising:
a first shell having an inner wall provided with a plurality of first teeth;
a second shell rotatable relative to the first shell and having an inner wall provided with a plurality of second teeth;
a gear wheel movably mounted between the first shell and the second shell and intermeshing with the first teeth of the first shell and the second teeth of the second shell to lock the second shell onto the first shell;
a push button movably mounted on the second shell and rested on the gear wheel to push and move the gear wheel to detach from the second teeth of the second shell so as to unlock the second shell from the first shell so that the second shell is rotatable relative to the first shell; and
an elastic member biased between the first shell and the gear wheel to push the gear wheel toward the second shell and the push button;
wherein the second shell has an inner portion formed with at least one limit slot, and the gear wheel has a first side directed toward the second shell and formed with at least one limit plate, the at least one limit plate extending into the respective limit slot of the second shell when the second shell is locked onto the first shell, and the at least one limit plate separated from the respective limit slot when the second shell is unlocked from the first shell.

2. The articulation in accordance with claim 1, wherein the first shell has a peripheral wall formed with a first receiving groove, and the second shell has a peripheral wall formed with a second receiving groove aligning with the first receiving groove of the first shell.

3. The articulation in accordance with claim 1, wherein the gear wheel has a toothed periphery extending through a whole circumferential length of the gear wheel and intermeshing with the first teeth of the first shell and the second teeth of the second shell.

4. The articulation in accordance with claim 3, wherein the toothed periphery of the gear wheel has an upwardly inclined guide ramp rested on the inner wall of the first shell and the inner wall of the second shell so that the gear wheel is pushed by the elastic member to move toward the second teeth of the second shell by guidance of the guide ramp.

5. The articulation in accordance with claim 1, wherein the at least one limit plate comprises a plurality of limit plates.

6. The articulation in accordance with claim 1, wherein the at least one limit slot comprises a plurality of limit slots.

7. The articulation in accordance with claim 1, wherein the gear wheel has a second side directed toward the first shell and rested on the elastic member.

8. The articulation in accordance with claim 1, further comprising a screw member in turn extended through the first shell, the elastic member, the gear wheel and the second shell, and a nut screwed onto the screw member and rested on the second shell, so that the first shell is combined with the second shell, and the gear wheel is movable on the screw member relative to the first shell and the second shell.

9. The articulation in accordance with claim 8, wherein the screw member has a first end formed with an enlarged head secured in the first shell and a second end protruded from the second shell and screwed into the nut.

10. The articulation in accordance with claim 1, wherein the push button has two downwardly extending radially opposite push plates each extended through the second shell and each rested on the gear wheel to push the gear wheel.

11. The articulation in accordance with claim 10, wherein each of the push plates of the push button has a distal end formed with an outwardly extending locking hook hooked onto a bottom wall of the second shell to attach the push button to the second shell.

12. The articulation in accordance with claim 1, wherein the second shell is rotatable relative to the first shell between a first position where the at least one limit plate of the gear wheel extends into the respective limit slot of the second shell, so that the gear wheel is pushed by the elastic member to move toward the second teeth of the second shell to lock the second shell onto the first shell and to push the push button to partially protrude outwardly from the second shell, and a second position where the at least one limit plate of the gear wheel is separated from the respective limit slot of the second shell, so that the gear wheel is stopped by a bottom wall of the second shell and is not pushed by the elastic member, and that the second shell is rotatable freely relative to the first shell through a relatively larger angle without having to press the push button successively.

13. The articulation in accordance with claim 1, wherein the gear wheel is located between the first shell and the second shell by push of the elastic member so that the gear wheel intermeshes with the first teeth of the first shell and the second teeth of the second shell at a normal state, and the at least one limit plate of the gear wheel extends into the respective limit slot of the second shell at a normal state.

14. The articulation in accordance with claim 1, wherein when the gear wheel is pushed by the push button to detach from the second teeth of the second shell, each of the limit plates of the gear wheel is separated from the respective limit slot of the second shell.

15. The articulation in accordance with claim 1, wherein the first teeth of the first shell are arranged in an annular shape, and the second teeth of the second shell are arranged in an annular shape.

* * * * *